(12) United States Patent
Yu et al.

(10) Patent No.: US 12,447,853 B2
(45) Date of Patent: Oct. 21, 2025

(54) ENERGY FACILITY ARRANGED TO PRIORITIZE FAVORABLE ENERGY MANAGEMENT ACTIONS TO HAPPEN EARLIER AND NON-FAVORABLE ENERGY MANAGEMENT ACTIONS TO HAPPEN LATER

(71) Applicant: Ford Global Technologies, LLC, Dearborn, MI (US)

(72) Inventors: Lan Yu, Canton, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 693 days.

(21) Appl. No.: 17/950,236

(22) Filed: Sep. 22, 2022

(65) Prior Publication Data
US 2024/0100984 A1  Mar. 28, 2024

(51) Int. Cl.
*B60L 53/64* (2019.01)
*B60L 53/51* (2019.01)
*B60L 53/53* (2019.01)
*B60L 53/63* (2019.01)

(52) U.S. Cl.
CPC ............... *B60L 53/64* (2019.02); *B60L 53/51* (2019.02); *B60L 53/53* (2019.02); *B60L 53/63* (2019.02)

(58) Field of Classification Search
CPC ..................................................... B60L 53/64
USPC ...................................................... 320/109
See application file for complete search history.

(56) References Cited

U.S. PATENT DOCUMENTS

| | | |
|---|---|---|
| 9,843,189 B2 | 12/2017 | Kamalasadan et al. |
| 11,207,991 B2 | 12/2021 | Miller et al. |
| 11,267,358 B2 | 3/2022 | Smolenaers |
| 11,283,262 B2 | 3/2022 | Arslan et al. |
| 2010/0292855 A1* | 11/2010 | Kintner-Meyer ....... B60L 53/64 700/36 |
| 2013/0103557 A1* | 4/2013 | Larocque .................. H02J 3/14 705/34 |
| 2019/0217739 A1* | 7/2019 | Sinha ...................... B60L 53/62 |

* cited by examiner

*Primary Examiner* — Jerry D Robbins
(74) *Attorney, Agent, or Firm* — David B. Kelley; Brooks Kushman P.C.

(57) ABSTRACT

An energy facility, such as a charge station operable for charging electrified vehicles, includes a controller. The controller selects from a group of energy management solutions which achieve favorable energy management activities with a same price of operation of the energy facility, an energy management solution resulting in favorable energy management results soonest. The controller controls the energy facility according to the selected energy management solution.

20 Claims, 11 Drawing Sheets

ENERGY FACILITY ARRANGED TO PRIORITIZE FAVORABLE ENERGY MANAGEMENT ACTIONS TO HAPPEN EARLIER AND NON-FAVORABLE ENERGY MANAGEMENT ACTIONS TO HAPPEN LATER

TECHNICAL FIELD

The present disclosure relates to an energy facility such as a charge station having a renewable energy source and a stationary energy storage device and being operative for charging an electrified vehicle.

BACKGROUND

An energy facility may charge an electrified vehicle (EV) with electrical energy when the EV is at the energy facility. The energy facility may obtain electrical energy from a renewable energy source and may include a stationary energy storage device for storing electrical energy.

SUMMARY

An object includes controlling an energy facility, such as a charge station, having a stationary energy storage device, such as an onsite battery, to implement favorable energy management actions earlier than otherwise would occur when all other relevant criteria are at least substantially equal.

Another object includes controlling the energy facility to implement non-favorable energy management actions later than otherwise would occur when all other relevant criteria are at least substantially equal.

A method for use with an energy facility is provided. The method includes selecting, from a group of energy management solutions which achieve favorable energy management activities with a same price of operation of the energy facility, an energy management solution resulting in favorable energy management results soonest. The method further includes controlling the energy facility according to the selected energy management solution.

The energy facility may include an energy storage device such as in the form of an onsite battery.

The energy management solutions may be to charge the onsite battery with electricity from an external grid purchasable at a same price. In this case, controlling the energy facility according to the selected energy management solution results in charging the onsite battery with electricity from the external grid soonest than all of the other energy management solutions.

The energy management solutions may be to charge a load with electricity from the onsite battery during periods when electricity from an external grid is purchasable at a same price that is higher than later periods. In this case, controlling the energy facility according to the selected energy management solution results in charging the load with electricity from the onsite battery soonest than all of the other energy management solutions.

The load may be an electrified vehicle or an appliance located at the energy facility.

The energy facility may include an onsite battery and a renewable energy generator such as in the form of a solar panel assembly.

The energy management solutions may be to charge a load with electricity from the onsite battery during periods preceding periods of forecasted excess renewable energy being generated by the renewable energy generator. In this case, controlling the energy facility according to the selected energy management solution results in charging the load with electricity from the onsite battery soonest than all of the other energy management solutions.

The step of selecting may include considering probability of future load of the energy facility and/or of variation of energy available to the energy facility.

The method may further include selecting from a second group of energy management solutions which achieve non-favorable energy management activities with a same price of operation of the energy facility, an energy management solution resulting in non-favorable energy management results latest. In this case, the method further includes controlling the energy facility according to the energy management solution selected from the second group.

The energy management solutions may be to charge a load with electricity from the onsite battery during periods when electricity from an external grid is purchasable at a same price that is lower than earlier periods. In this case, controlling the energy facility according to the energy management solution selected from the second group results in charging the load with electricity from the onsite battery latest than all of the other energy management solutions.

An energy facility is provided. The energy facility includes a controller configured to select from a group of energy management solutions which achieve favorable energy management activities with a same price of operation of the energy facility, an energy management solution resulting in favorable energy management results soonest, and to control the energy facility according to the selected energy management solution.

An energy facility having an energy storage device operable for receiving electricity from an external grid at different price rates during different periods with two of the periods having the lowest price rates is also provided. This energy facility includes a controller configured to charge the energy storage device during an earlier one of the two periods with electricity from the external grid in lieu of charging the energy storage device during a later one of the two periods with electricity from the external grid.

The later one of the two periods may have a lower or higher rate than the earlier one of the two periods.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
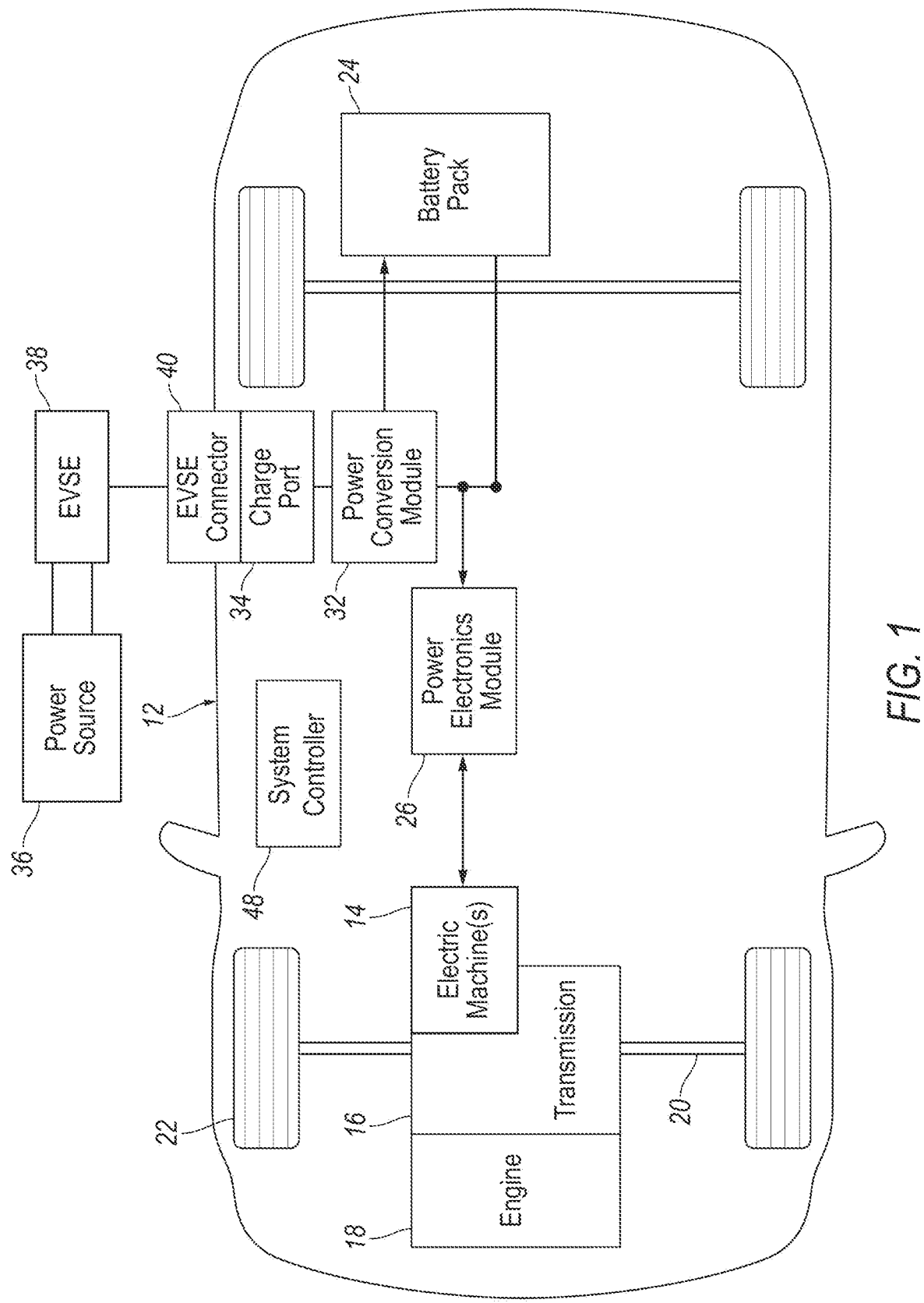
FIG. 1 illustrates a block diagram of an electrified vehicle (EV) having a traction battery.

Referring now to FIG. 1, a block diagram of an exemplary electrified vehicle (EV) 12 is shown. In this example, EV 12 is a plug-in hybrid electric vehicle (PHEV) having an engine 18 and a traction battery (or "battery pack") 24. In other embodiments, EV 12 is battery electric vehicle (BEV). In a BEV configuration, EV 12 does not include engine 18.

EV 12 includes one or more electric machines 14 mechanically connected to a transmission 16. Electric machine 14 is capable of operating as a motor and as a generator. Transmission 16 is mechanically connected to engine 18 and to a drive shaft 20 that is mechanically connected to wheels 22 of EV 12. Electric machine 14 can provide propulsion capability while engine 18 is turned on or off. Electric machine 14 acting as a generator can recover energy that may normally be lost as heat in a friction braking system.

Traction battery 24 stores electrical energy that can be used by electric machine 14 for propelling EV 12. Traction battery 24 typically provides a high-voltage (HV) direct current (DC) output. Traction battery 24 is electrically connected to a power electronics module 26 which is electrically connected to electric machine 14. Power electronics module 26 provides the ability to bi-directionally transfer energy between traction battery 24 and electric machine 14. For example, traction battery 24 may provide a DC voltage while electric machine 14 may require a three-phase alternating current (AC) current to function. Power electronics module 26 may convert the DC voltage to a three-phase AC current to operate electric machine 14. In a regenerative mode, power electronics module 26 may convert three-phase AC current from electric machine 14 acting as a generator to DC voltage compatible with traction battery 24.

Traction battery 24 is rechargeable by an external power source 36. External power source 36 may be a connection to an electrical outlet. External power source 36 may be an electrical power distribution network or grid as provided by an electric utility company. External power source 36 may be electrically connected to a charger or electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32 of EV 12 may condition electric power supplied from EVSE 38 to provide the proper voltage and current levels to traction battery 24. Power conversion module 32 may interface with EVSE 38 to coordinate the delivery of electric power to traction battery 24. Additionally, EV 12 may be configured to provide electric power from traction battery 24 to external power source 36 via EVSE 38 and EVSE connector 40. Transferring electric power from traction battery 24 to external power source 36 may require utilizing power conversion module 32 as external power source 36 may be on AC power only. Further, traction battery 24 may be directly connected to charge port 34 to transfer and/or receive DC power.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating EV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Figure 2:
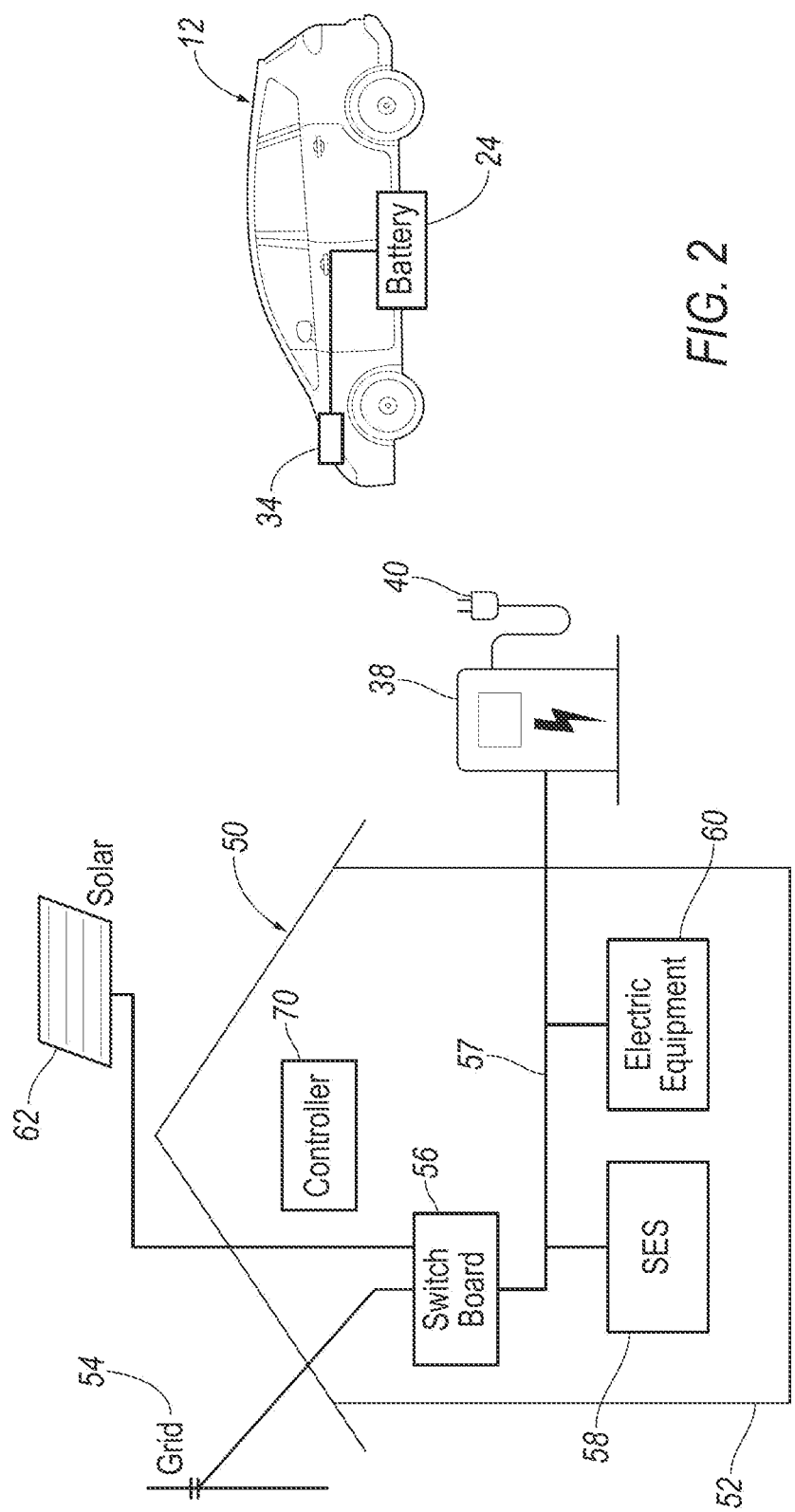
FIG. 2 illustrates a schematic diagram of the EV and an energy facility operative for charging the EV when the EV is at the energy facility, the energy facility having a renewable energy source (e.g., a solar panel assembly) and a stationary energy storage (SES) device (e.g., an onsite battery)

Referring now to FIG. 2, with continual reference to FIG. 1, a schematic diagram of EV 12 and an energy facility 50 are shown. Energy facility 50 functions as an external power source like external power source 36 shown in FIG. 1 and is operative for charging EV 12 when the EV is at the energy facility. In this regard, energy facility 50 may be a charge station and may include EVSE 38 with EVSE connector 40.

Energy facility 50 in the present example is implemented for a house or building ("house") 52. Energy facility 50 accesses electrical energy from an external power grid 54 via a switch board 56 of the energy facility. Switch board 56 is configured to provide various components of energy facility 50 with electrical energy via an internal powerline 57. Energy facility 50 may include one or more electric equipment 60 (e.g., one or more appliances) configured to consume electricity in providing various features to house 52.

Energy facility 50 further includes at least one stationary energy storage (SES) device 58. SES device 58 is configured to store electrical energy received via internal powerline 57 from grid 54 and from other sources. SES device 58 is further configured to output its stored electrical energy to internal pipeline 57 such as to charge traction battery 24 of EV 12 and/or to power electric equipment 60. SES device 58 may be implemented in various forms. As an example, SES device 58 includes a rechargeable battery (e.g., lithium-ion battery). For ease of reference, SES device 58 will be assumed as being an onsite battery. As the electrical energy may be stored as DC power in onsite battery 58, one or more DC/AC inverters and/or DC/DC converters may be provided for power transitions.

Energy facility 50 further includes at least one renewable energy source 62. As an example, renewable energy source 62 is a solar panel assembly. Solar panel assembly 62 is configured to generate electrical energy from sunlight. Solar panel assembly 62 is connected to switch board 56 to supply electrical energy generated by the solar panel assembly to internal power line 57. In this way, the electrical energy generated by solar panel assembly 62 may be used to charge onsite battery 58, power electric equipment 60, and/or charge traction battery 24 of EV 12. Additionally, or alternatively, the at least one renewable energy source 62 may involve other means of power generating capabilities such as a wind turbine or the like.

With continuing reference to FIG. 2, internal powerline 57 is connected to EVSE 38 which is configured to transfer electric energy with one or more EVs. For simplicity, only one EV 12 is illustrated in FIG. 2. EVSE 38 may be installed within or near house 52 (e.g., in a garage) and adapted to a home electric energy configuration having a predefined voltage and maximum current supported by switch board 56. As discussed with reference to FIG. 1, EVSE 38 is configured to connect to EV 12 via charge port 34 to charge traction battery 24. Additionally, EVSE 38 may be further configured to draw electric power from traction battery 24 to supply electric power to grid 54, SES device 58, and/or electric equipment 60. For instance, in case of a power outage or shortage from grid 54, EVSE 38 may be configured to draw electric power from EV 12 to power electric equipment 60. Additionally, switch board 56 may be configured to draw electric power from solar panel assembly 62, onsite battery 58, and/or traction battery 24 to supply electric power to grid 54.

Energy facility 50 further includes a controller 70 operable for controlling and coordinating the power management of the energy facility. Controller 70 may be a dedicated controller located within house 52 and connected to components of energy facility 50 via wired or wireless connections. Alternatively, controller 70 may be remotely implemented via a cloud server through the Internet and configured to remotely monitor and control the operations of components of energy facility 50. Controller 70 may be provided with software to monitor and control the operations of the various components of energy facility 50. Controller 70 may be provided with an interface associated with input and output devices to interact with a user of energy facility 50. Controller 70 may be connected to a cloud via a public or private network to communicate with other entities such as the utility company and weather agencies to facilitate the planning and controlling of energy facility 50. Controller 70 and controller 48 of EV 12 may be in communication to coordinate operations involving EV 12 and energy facility 50.

As described, energy facility 50 is operable for charging EV 12 and includes a renewable energy source (namely, solar panel assembly 62) and a SES device (namely, onsite battery 58). The energy system of houses, commercial facilities, and other industrial settings including charging depots (collectively labeled "energy facility" for ease of reference) is becoming more complex with the addition of renewable energy sources, SES devices, and charging systems and with a desire to minimize the price of energy to operate the energy facility.

Typically, energy facility 50 is on a time-of-use (TOU) rate plan for receiving electrical energy from grid 54. This is an issue in that often times during the day the price of electrical energy from grid 54 will be significantly higher or lower than during other times of the day. With energy facility 50 having onsite energy storage such as in the form of onsite battery 58, this variation in the price of grid electricity can be used advantageously to purchase electrical energy from grid 54 when the price is low, for use later when the price is high, whenever the onsite battery is not fully charged.

An optimal energy management control strategy can be developed to manage the energy flow involving onsite energy storage, renewable energy sources, and other distributed energy resources associated with energy facility 50. Many methods can be used to determine optimal solutions for this energy management including linear programming, gradient decent, neural network, non-linear optimization, and searching based optimization methodologies. Due to the nature of the problem, it happens that there are multiple energy management solutions for the management of the onsite distributed energy resources over a given time period that will result in the same price of operation including other important objectives like resiliency.

Energy management solutions which result in the same price of operation can be classified into two groups. The first group of energy management solutions which result in the same price of operation are energy management solutions which achieve favorable (e.g., beneficial) energy management activities. The second group of energy management solutions which result in the same price of operation are energy management solutions which achieve non-favorable (e.g., detrimental) energy management activities.

The presence of multiple energy management solutions which result in the same price of operation creates an opportunity to use additional criteria to help mitigate the chances associated with uncertainty in the future need for energy (load behavior) and the availability of intermittent energy sources like wind and solar.

The present disclosure provides an energy management control strategy ("the proposed energy management control strategy") which takes advantage of multiple energy management solutions resulting in the same price of operation being available. The proposed energy management control strategy takes advantage of this situation by prioritizing energy management solutions that achieve favorable energy management activities at the earliest instance available and by delaying energy management solutions that achieve non-favorable energy management activities at the latest instance possible.

In this way, when a group of energy management solutions which achieve favorable energy management activities with the same price of operation are available, the energy management solution resulting in favorable energy management results soonest is implemented. Likewise, when a group of energy management solutions which achieve non-favorable energy management activities with the same price of operation are available, the energy management solution resulting in non-favorable energy management results latest is implemented.

As set forth, the proposed energy management control strategy prioritizes energy management solutions that achieve favorable energy management activities at the earliest instance available and delays non-favorable energy management activities to the latest possible instance, when all other relevant criteria are at least substantially equal. By prioritizing favorable actions to happen earlier and non-favorable actions to happen later, chances associated with changes in the load and energy sources can be mitigated.

Controller 70 is operable for controlling energy facility 50 according to the proposed energy management control strategy. Consequently, energy facility 50 implements favorable energy management actions earlier than usual and non-favorable energy management actions later than usual.

Referring now to FIGS. 3A, 3B, 3C, and 3D, an example of the problem in not prioritizing favorable actions to happen earlier than usual and non-favorable actions to happen later than usual will be described.

Figure 3A:
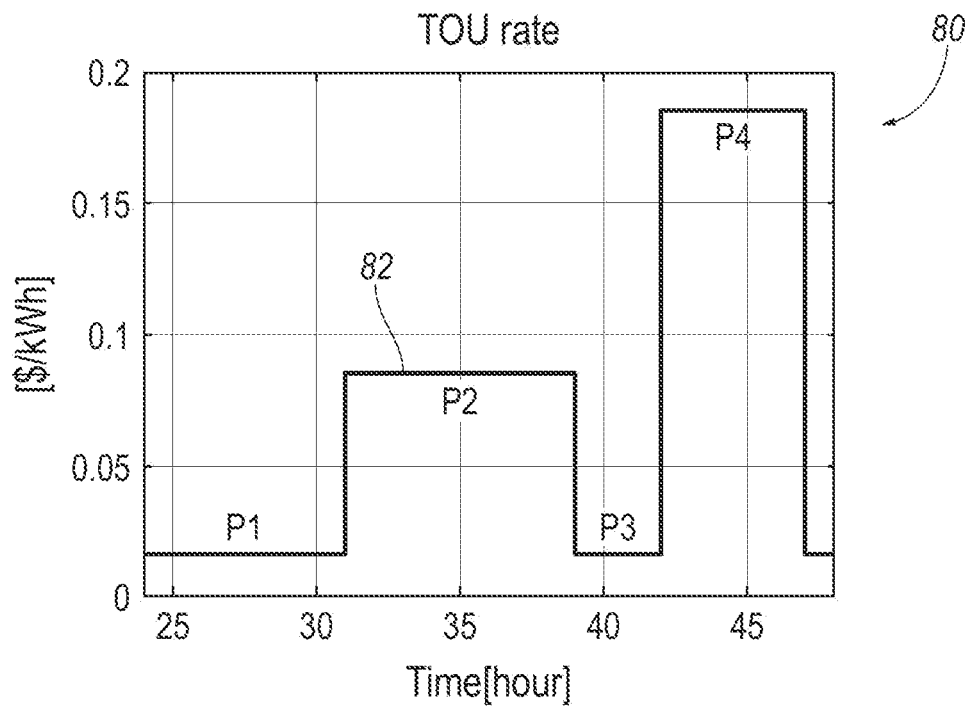
FIG. 3A illustrates an exemplary graph of a time-of-use (TOU) rate plan for the energy facility during a day, the graph including a plot of the TOU rate vs. the time of day.

FIG. 3A illustrates an exemplary graph 80 of a time-of-use (TOU) rate plan for energy facility 50 during a day. Graph 80 includes a plot 82 of the TOU rate vs. the time of day. As shown in graph 80, the day includes four TOU rate periods P1, P2, P3, and P4. First and third periods P1 and P3 have the lowest TOU rates. In this example, first and third periods P1 and P3 have roughly the same TOU rate with second period P2 being a higher TOU rate and fourth period P4 being the highest TOU rate. As described, graph 80 depicts an example electricity TOU rate with multiple low-price periods. In other examples, the TOU rate of third period P3 is lower than the TOU rate of first period P1. In other examples, the TOU rate of third period P3 is greater than the TOU rate of first period P1. In other examples, second period P2 has the highest TOU rate.

As the price of electricity is the same in first and third periods P1 and P3, the desired charging of onsite battery 58 to store electricity for use in fourth period P4, when the TOU rate is highest, can be accomplished in either first or third period P1 or P3 with the same overall price for the electricity. Since an optimal energy management control strategy is based on a prediction of the future loads and the future availability of renewable energy, there is uncertainty in implementing the energy management solution that charges onsite battery 58 in the later third period P3. The uncertainty is that the amount of low-price renewable energy available onsite during third period P3 may be lower than predicted or that the loads may unexpectedly increase in second or fourth periods P2 or P4 resulting in insufficient time, energy, or both to meet the overall need and a missed opportunity to utilize the energy from first period P1 that had the lower overall price.

Figure 3B:
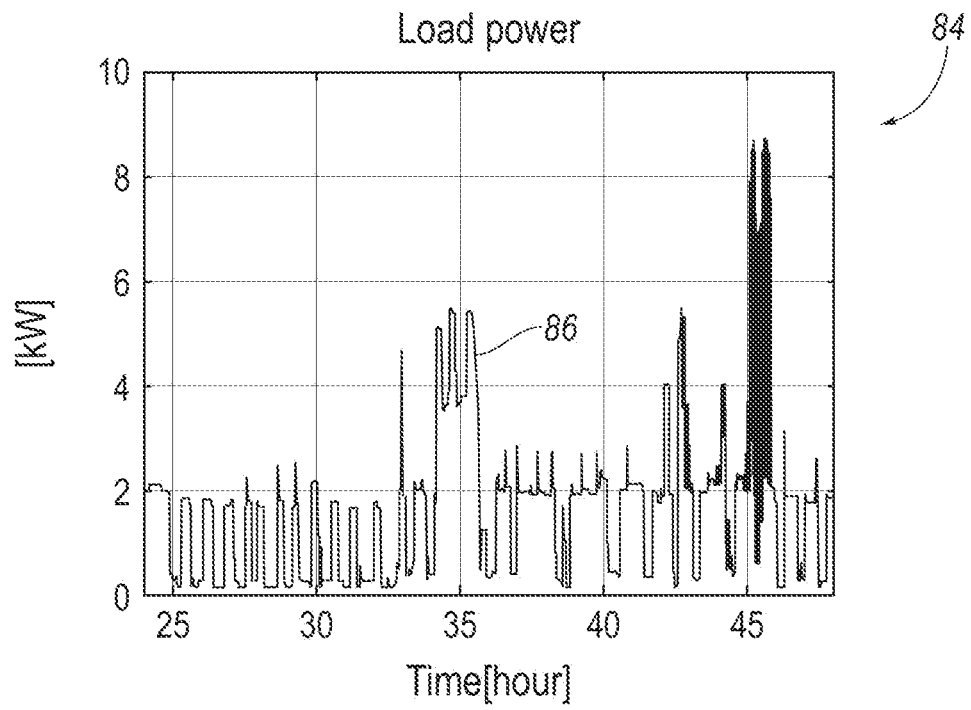
FIG. 3B illustrates an exemplary graph of the load power of the energy facility during the day, the graph including a plot of the load power of the energy facility vs. the time of day.

FIG. 3B illustrates an exemplary graph 84 of the load power of energy facility 50 during the day. Graph 84 includes a plot 86 of the load power of energy facility 50 vs. the time of day.

Figure 3C:
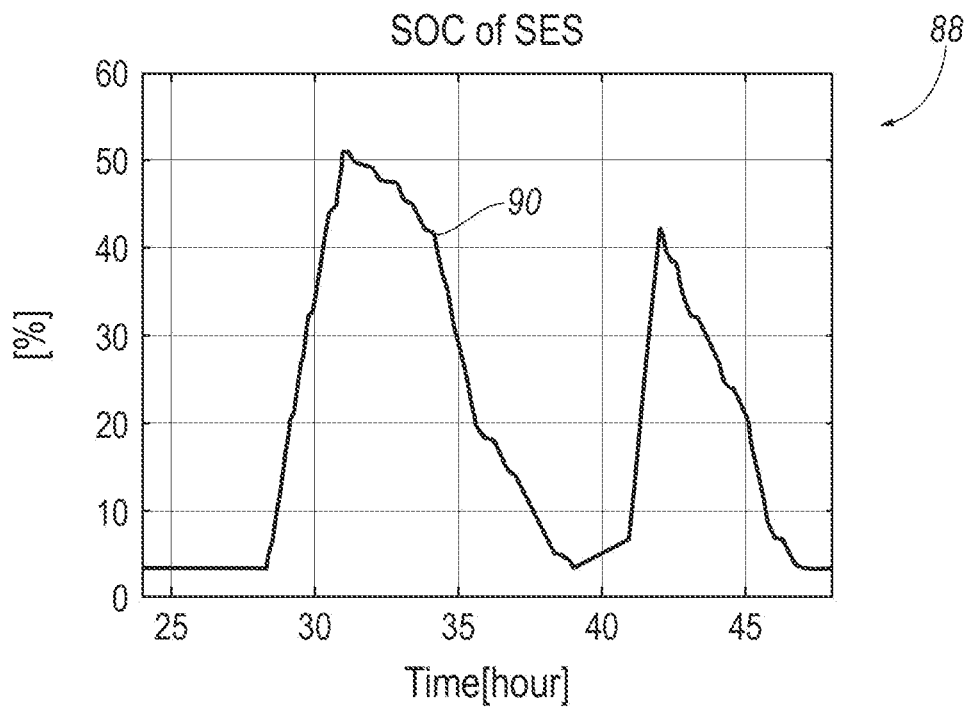
FIG. 3C illustrates an exemplary graph of charge status (e.g., state-of-charge (SOC)) of the onsite battery of the energy facility during the day when the energy facility is controlled according to a typical energy management control strategy, the graph including a plot of the SOC of the onsite battery vs. the time of day.

FIG. 3C illustrates an exemplary graph 88 of charge status (e.g., state-of-charge (SOC)) of onsite battery 58 during the day when energy facility 50 is controlled according to a typical energy management control strategy. Graph 88 includes a plot 90 of the SOC of onsite battery 58 vs. the time of day. Per the typical energy management control strategy, as indicated by onsite battery SOC plot 90, onsite battery 58 is charged roughly to the same extent during first and third periods P1 and P3 and is not relatively fully charged during either of first and third periods P1 or P3. For instance, as indicated by onsite battery SOC plot 90, onsite battery 58 is charged to a SOC of about 50% at the end of first period P1 and is charged to about 40% at the end of the third period P3.

Figure 3D:
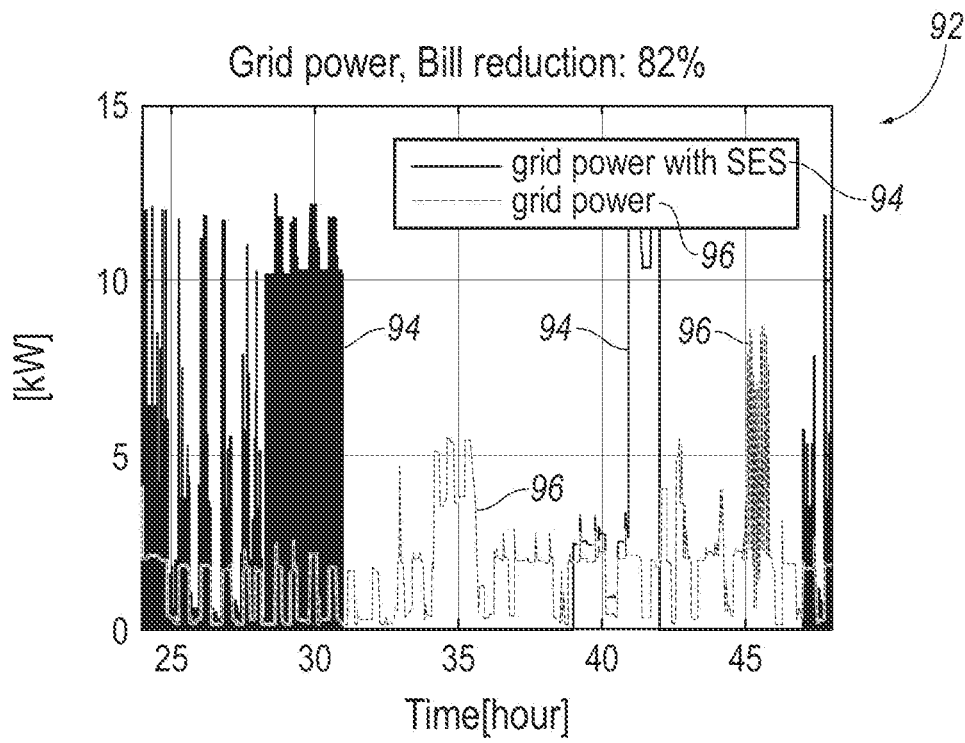
FIG. 3D illustrates an exemplary graph of the grid power consumed by the energy facility during the day, the graph including a first plot of the grid power consumed by the energy facility vs. the time of day when the energy facility is controlled according to the typical energy management control strategy and a second plot of the grid power consumed by the energy facility vs. the time of day when the energy facility lacks the onsite battery and thereby is not controlled according to the typical energy management control strategy.

FIG. 3D illustrates an exemplary graph 92 of the grid power consumed by energy facility 50 during the day. Graph 92 includes a first plot 94 (a couple instances of first plot 94 are marked with reference numeral "94") of the grid power consumed by energy facility 50 vs. the time of day when the energy facility is controlled according to the typical energy management control strategy. As described, the typical energy management control strategy involves energy facility 50 having onsite battery 58 and charging the onsite battery roughly to the same, non-fully charged extent during first and third periods P1 and P3. Graph 92 further includes a second plot 96 (a couple instances of second plot 96 are marked with reference numeral "96") of the grid power consumed by energy facility 50 vs. the time of day when the energy facility lacks onsite battery 58 and thereby is not controlled according to the typical energy management control strategy. In this example, the operating electricity price of energy facility 50 when controlled according to the typical energy management control strategy is 82% of the operating electricity price of the energy facility when the energy facility lacks onsite battery 58 and is thereby not controlled according to the typical energy management control strategy.

As described, FIGS. 3A, 3B, 3C, and 3D in conjunction show a baseline result with a typical energy management control strategy that does not prioritize favorable energy management solutions to occur sooner.

Figure 4A:
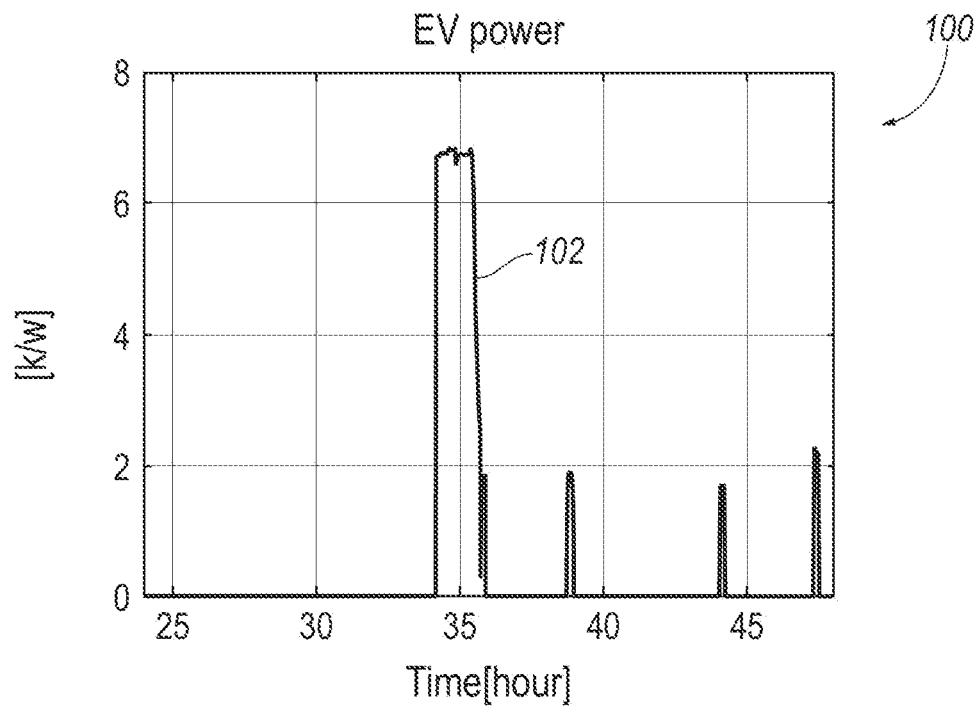
FIG. 4A illustrates an exemplary graph of the load power of the energy facility for an EV charge event unexpectedly occurring, the graph including a plot of the load power of the energy facility vs. the time of day.
Figure 4B:
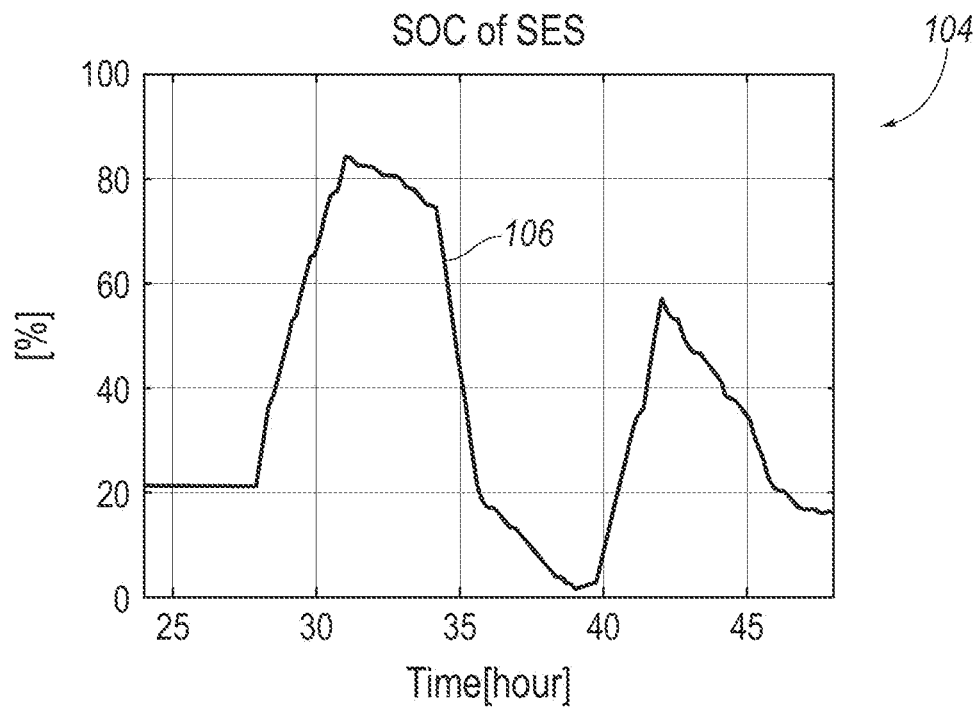
FIG. 4B illustrates an exemplary graph of the SOC of the onsite battery of the energy facility during the day when the energy facility is controlled according to an energy management control strategy in accordance with the present disclosure ("the proposed energy management control strategy"), the graph including a plot of the SOC of the onsite battery vs. the time of day.
Figure 4C:
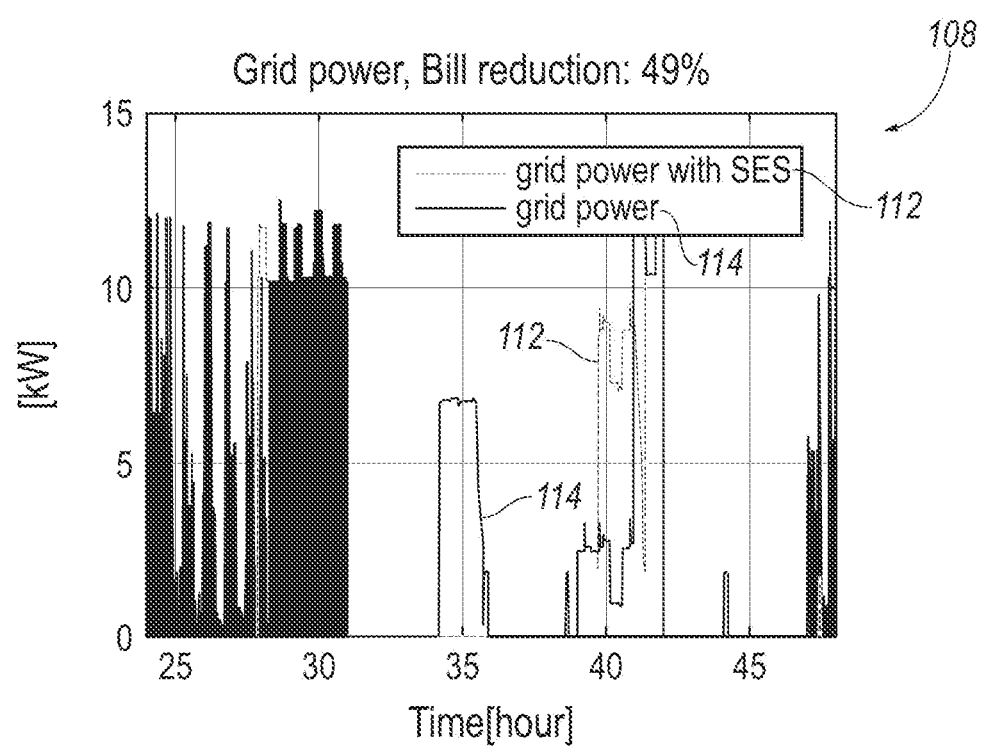
FIG. 4C illustrates an exemplary graph of the grid power consumed by the energy facility during the day, the graph including a first plot of the grid power consumed by the energy facility vs. the time of day when the energy facility is controlled according to the proposed energy management control strategy and a second plot of the grid power consumed by the energy facility vs. the time of day when the energy facility lacks the onsite battery and thereby is not controlled according to the proposed energy management control strategy.

Referring now to FIGS. 4A, 4B, and 4C, with continual reference to FIGS. 3A, 3B, 3C, and 3D, an example of controlling energy facility 50 according to the proposed energy management control strategy will now be described. In being controlled according to the proposed energy management control strategy, energy facility 50 prioritizes favorable energy management actions to happen earlier than otherwise would occur and delays non-favorable energy management actions to happen later than otherwise would occur, when all other relevant criteria are at least substantially equal. As such, the proposed energy management control strategy moves favorable energy management solutions to occur as soon as possible and delays non-favorable energy management solutions to occur as late as possible.

FIGS. 4A, 4B, and 4C pertain to an example of the proposed energy management control strategy controlling energy facility 50 to prioritize favorable energy management actions to happen earlier than usual. Particularly, FIGS. 4A, 4B, and 4C pertain to an example result of the proposed energy management control strategy for the same TOU rate profile shown in FIG. 3A and the same load profile shown in FIG. 3B except for a charge event of EV 12 unexpectedly occurring in the earlier second period P2 instead of a forecasted later third period P3. The EV charge event involves energy facility 50 charging EV 12. This is an example of a situation which occurs when a load forecast is inaccurate.

FIG. 4A illustrates an exemplary graph 100 of the load power of energy facility 50 for the EV charge event unexpectedly occurring during the earlier second period P2 instead of the expected later third period P3. Graph 100 includes a plot 102 of the load power of energy facility 50 vs. the time of day. Plot 102 is depictive of the EV charge event being shifted to happen during second period P2.

With energy facility 50 being controlled according to the typical energy management control strategy described above with reference to FIG. 3C, the result would have been onsite battery 58 not having been charged enough to meet the unexpected higher load in the second period P2. This would have resulted in the typical energy management control strategy having to purchase electricity from grid 54 at the higher price TOU rate period P2.

In contrast, with energy facility 50 being controlled according to the proposed energy management control strategy, the energy facility charges onsite battery 58 to a level sufficient to meet the forecasted demand in the higher price second and fourth periods P2 and P4.

In this regard, FIG. 4B illustrates an exemplary graph 104 of the SOC of onsite battery 58 during the day when energy facility 50 is controlled according to the proposed energy management control strategy. Graph 104 includes a plot 106 of the SOC of onsite battery 58 vs. the time of day. Per the proposed energy management control strategy, as indicated by onsite battery SOC plot 106, onsite battery 58 is charged more during first period P1 in comparison with the typical energy management control strategy. For instance, as indicated by onsite battery SOC plot 106, onsite battery 58 is charged to a SOC of about 80% at the end of first period P1 instead of just 50% depicted in FIG. 3C in the case of the typical energy management control strategy. Likewise, as further indicated by onsite battery SOC plot 106, onsite battery 58 is charged more during third period P3 in comparison with the typical energy management control strategy. For instance, onsite battery 58 is charged to a SOC of about 60% at the end of third period P3 instead of just 40% depicted in FIG. 3C in the case of the typical energy management control strategy. Controlling energy facility 50 in this manner to charge onsite battery 58 to a level sufficient to meet the forecasted demand in the higher price second and fourth periods P2 and P4 allows the energy facility to be robust to the unexpected EV charging event or other unexpected electrical load in second period P2.

As described, onsite battery SOC plot 106 of FIG. 4B is depictive of the SOC of onsite battery 58 resulting from the proposed energy management control strategy which beneficially charges the onsite battery at the earliest time that achieves an optimal energy management strategy.

FIG. 4C illustrates an exemplary graph 108 of the grid power consumed by energy facility 50 during the day. Graph 108 includes a first plot 110 of the grid power consumed by energy facility 50 vs. the time of day when the energy facility is controlled according to the proposed energy management control strategy. As described, the proposed energy management control strategy involves charging onsite battery 58 relatively more fully in the first period P1 (i.e., prioritize this favorable energy management activity to happen sooner in the earlier first period P1 than would otherwise occur in the later third period P3). Graph 108 includes a second plot 112 of the grid power consumed by energy facility 50 vs. the time of day when the energy facility lacks the onsite battery and thereby is not controlled according to the proposed energy management control strategy.

In this example, the operating electricity price of energy facility 50 when controlled according to the proposed energy management control strategy is 49% of the operating electricity price of the energy facility when the energy facility lacks onsite battery 58 and is thereby not controlled according to the proposed energy management control strategy. As such, the resulting price of electricity with the proposed energy management control strategy is lower than the baseline energy management strategy which would have been forced to purchase electricity for the unexpected EV charging event in second period P2. This lower price is a result of the proposed energy management control strategy charging onsite battery 58 at the earliest possible time that allows it to achieve the optimal energy management strategy.

As described, FIGS. 4A, 4B, and 4C in conjunction show an example result with the proposed energy management control strategy, which prioritizes favorable energy management actions to occur sooner than usual, for an unexpected load shift in the form of EV charging.

Referring now to FIGS. 5A, 5B, 5C, and 5D, another example of the proposed energy management control strategy controlling energy facility 50 to prioritize favorable energy management actions to happen earlier than usual will now be described.

Figure 5A:
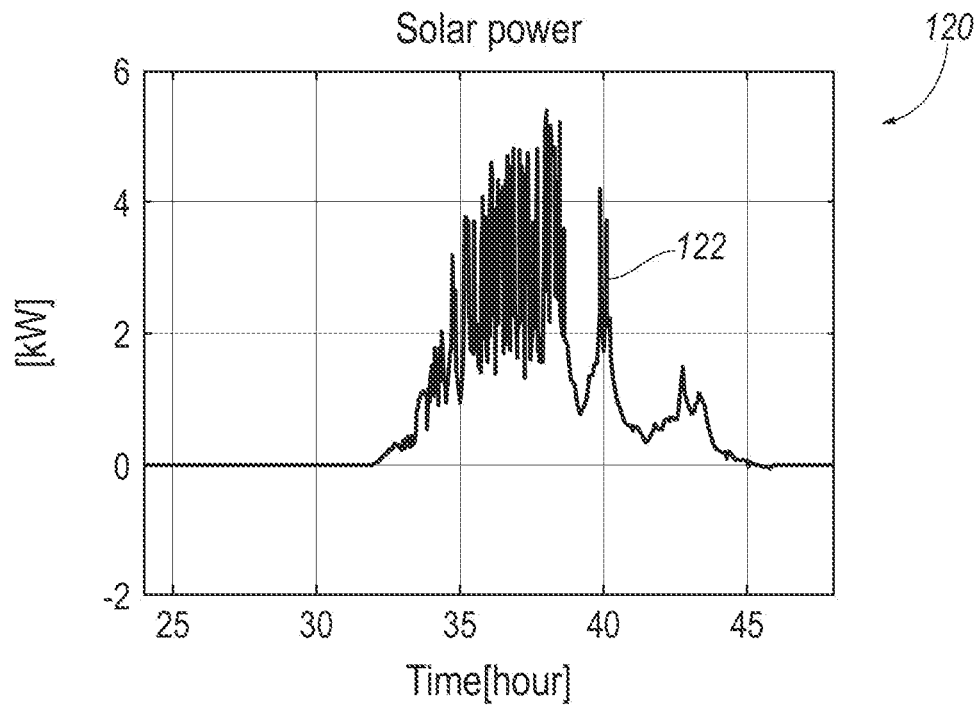
FIG. 5A illustrates an exemplary graph of a predicted solar power available from the solar panel assembly of the energy facility during the day, the graph including a plot of the predicted available solar panel vs. the time of day.
Figure 5B:
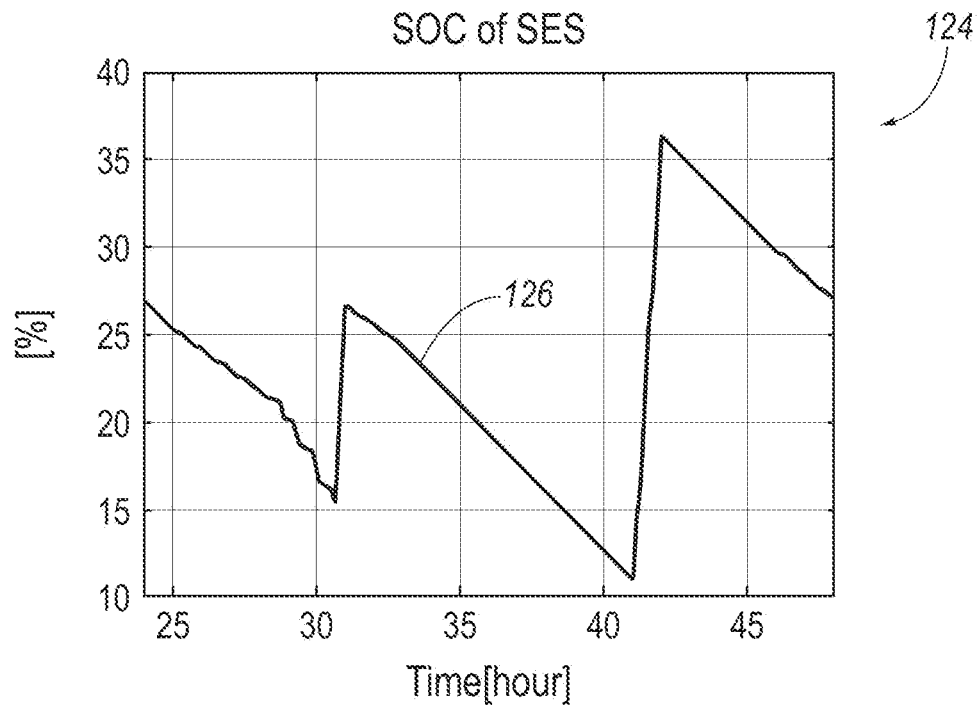
FIG. 5B illustrates an exemplary graph of the SOC of the onsite battery of the energy facility during the day when the energy facility is controlled according to the typical energy management control strategy, the graph including a plot of the SOC of the onsite battery vs. the time of day.

FIG. 5A illustrates an exemplary graph 120 of a predicted solar power available from solar panel assembly 62 of energy facility 50 during the day. Graph 120 includes a plot 122 of the predicted available solar panel vs. the time of day. FIG. 5B illustrates an exemplary graph 124 of the SOC of onsite battery 58 during the day when energy facility 50 is controlled according to the typical energy management control strategy. Graph 124 includes a plot 126 of the onsite battery SOC vs. the time of day.

Per FIG. 5A, there is a predicted or forecasted solar energy profile that the typical energy management control strategy would have assumed would allow it to offset the load predicted in periods P2, P3, and P4. As a result of this assumption, as indicated by FIG. 5B, the typical energy management control strategy would not have charged onsite battery 58 more than a minimal amount during period P1.

Figure 5C:
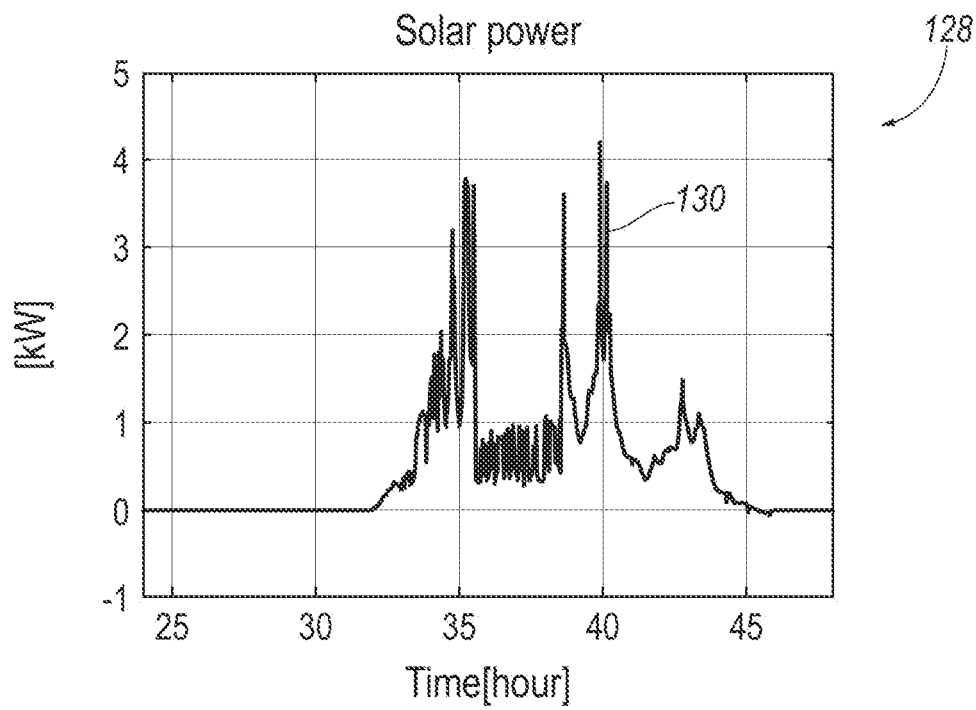
FIG. 5C illustrates an exemplary graph of an actual solar power available from the solar panel assembly of the energy facility during the day, the graph including a plot of the actual available solar panel vs. the time of day.

FIG. 5C illustrates an exemplary graph 128 of an actual solar power available from solar panel assembly 62 of energy facility 50 during the day. Graph 128 includes a plot 132 of the actual available solar panel vs. the time of day.

From a comparison of FIGS. 5A and 5C, the actual solar energy profile per FIG. 5C has a reduced available solar energy than the predicted solar energy profile per FIG. 5A. The actual solar energy available per FIG. 5C being lower than predicted per FIG. 5A results in the typical energy management control strategy having to purchase additional electricity from electric grid 54 during periods P2, P3, and P4, causing its overall price to be higher.

Figure 5D:
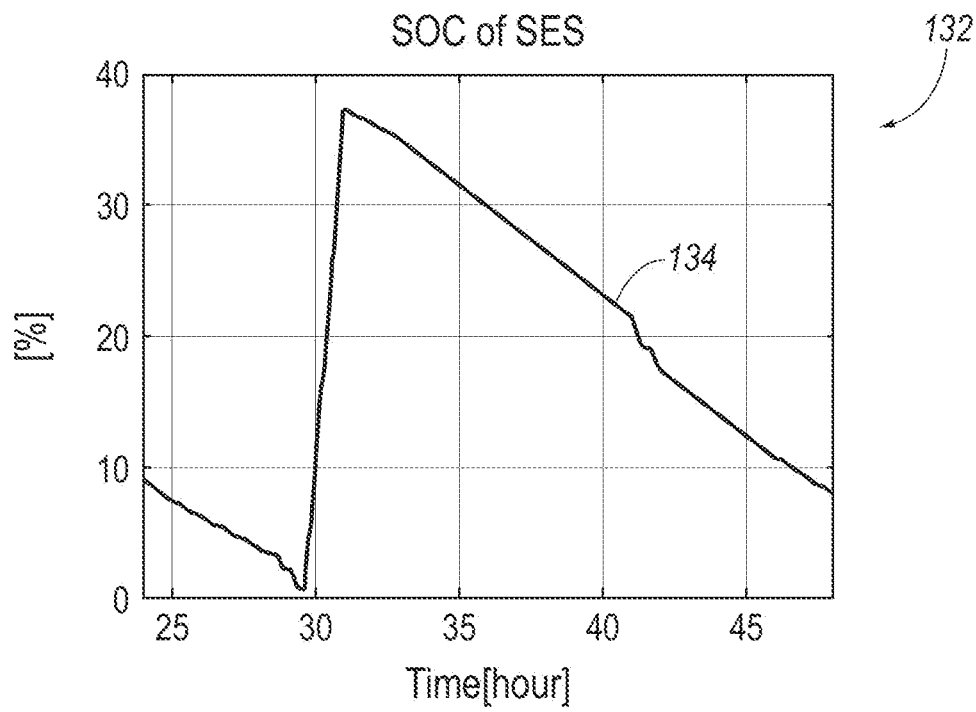
FIG. 5D illustrates an exemplary graph of the SOC of the onsite battery of the energy facility during the day when the energy facility is controlled according to the proposed energy management control strategy, the graph including a plot of the SOC of the onsite battery vs. the time of day.

FIG. 5D illustrates an exemplary graph 132 of the SOC of onsite battery 58 during the day when energy facility 50 is controlled according to the proposed energy management control strategy. Graph 132 includes a plot 134 of the onsite battery SOC vs. the time of day.

As indicated, FIG. 5D shows the resulting onsite battery SOC using the proposed energy management control strategy. With the proposed energy management control strategy, onsite battery 58 is charged to a higher SOC using the low-price electricity in period 1. Even though the proposed energy management control strategy does not forecast needing this energy during periods P2, P3, or P4, it knows that the energy will eventually be used and that it will not have an opportunity to purchase it at a lower price in the future (for example, during period P2). The SOC that onsite battery 58 is charged to in period P1 is still low enough to accommodate the originally predicted excess solar energy from the solar energy and load forecasts at the beginning of period P1. The result of the proposed energy management control strategy is that onsite battery 58 has sufficient energy to offset the unexpected drop in the available solar energy, resulting in a lower electricity price than the typical energy management control strategy.

As described, FIGS. 5A, 5B, 5C, and 5D in conjunction show an example result with the proposed energy management control strategy, which prioritizes favorable management decisions to occur sooner than usual, for an unexpected reduction in solar energy (more generally, renewable energy) available to energy facility 50.

The two above-described examples highlight the benefits of the proposed energy management control strategy which implements favorable energy management actions (or events) to happen as soon as possible and non-favorable energy management events to happen as late as possible. Examples of favorable energy management actions include charging of onsite battery 58 using the lowest price of electricity even when a later time period would offer the same lowest price of electricity, discharging the onsite battery during periods of high price preceding either an upcoming low-price period and/or excess solar energy, etc. Examples of non-favorable energy management actions are power loads that can be shifted in time, e.g., EV charging, dishwashers, heating or cooling of the facility, etc., discharging onsite battery 58 earlier than needed to achieve a desired goal, etc.

Figure 6A:
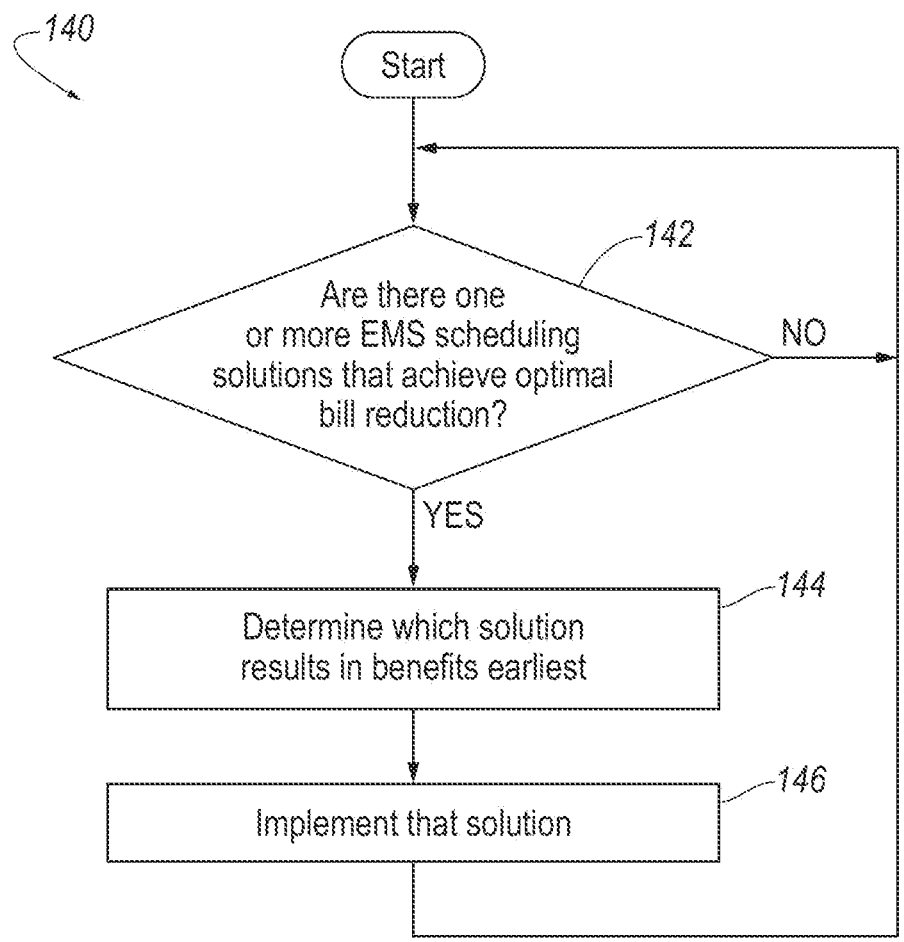
FIG. 6A illustrates a flowchart depicting general operation steps of the proposed energy management control strategy in controlling the energy facility to prioritize favorable energy management actions to happen earlier than otherwise would occur when all other relevant criteria are at least substantially equal.
Figure 6B:
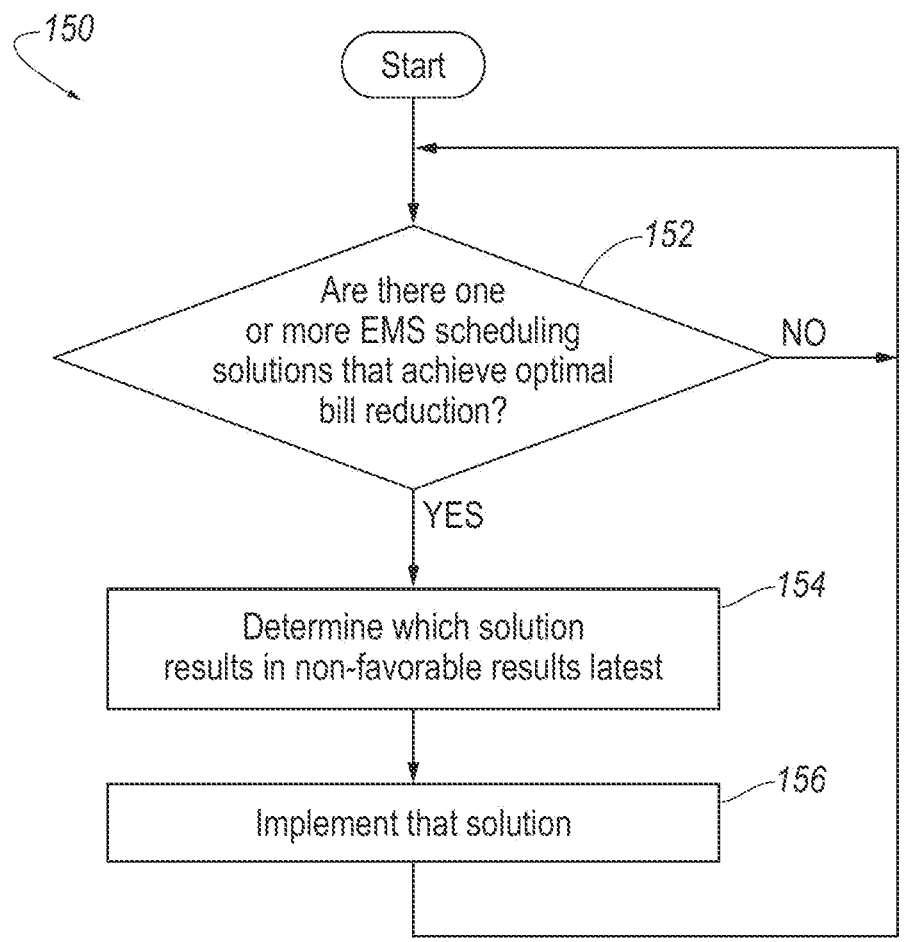
FIG. 6B illustrates a flowchart depicting general operation steps of the proposed energy management control strategy in controlling the energy facility to prioritize non-favorable energy management actions to happen later than otherwise would occur when all other relevant criteria are at least substantially equal.

Referring now to FIGS. 6A and 6B, respective flowcharts 140 and 150 depicting general operation steps of the proposed energy management control strategy are shown. Flowcharts 140 and 150 are outlines of the decision-making process for the proposed energy management control strategy.

Flowchart 140 of FIG. 6 depicts general operation steps of the proposed energy management control strategy in controlling energy facility 50 to prioritize favorable energy management actions to happen earlier than otherwise would occur when all other relevant criteria are at least substantially equal. As such, flowchart 140 is indicative of decision making based on evaluating favorable (i.e., beneficial) energy management solutions.

In operation, controller 70 detects whether there are one or more energy management strategy ("EMS") scheduling solutions that achieve optimal bill reduction, as indicated in decision block 142. That is, controller 70 detects whether multiple energy management solutions which achieve favorable energy management activities with the same price of operation are available. When a group of such energy management solutions are available, controller 70 chooses from the group the energy management solution which results in favorable energy management results earliest, as indicated in process block 144. Controller 70 then controls energy facility 50 to implement the chosen energy management solution, as indicated in process block 146.

Flowchart 150 of FIG. 6B depicts general operation steps of the proposed energy management control strategy in controlling energy facility 50 to delay non-favorable energy management actions to happen later than otherwise would occur when all other relevant criteria are at least substantially equal. As such, flowchart 150 is indicative of decision making based on evaluating non-favorable energy management solutions.

In operation, controller 70 detects whether there are one or more EMS scheduling solutions that achieve optimal bill reduction, as indicated in decision block 152. That is, controller 70 detects whether multiple energy management solutions which achieve non-favorable energy management activities with the same price of operation are available. When a group of such energy management solutions are available, controller 70 chooses from the group the energy management solution which results in non-favorable energy management results latest, as indicated in process block 154. Controller 70 then controls energy facility 50 to implement the chosen energy management solution, as indicated in process block 156.

Figure 7:
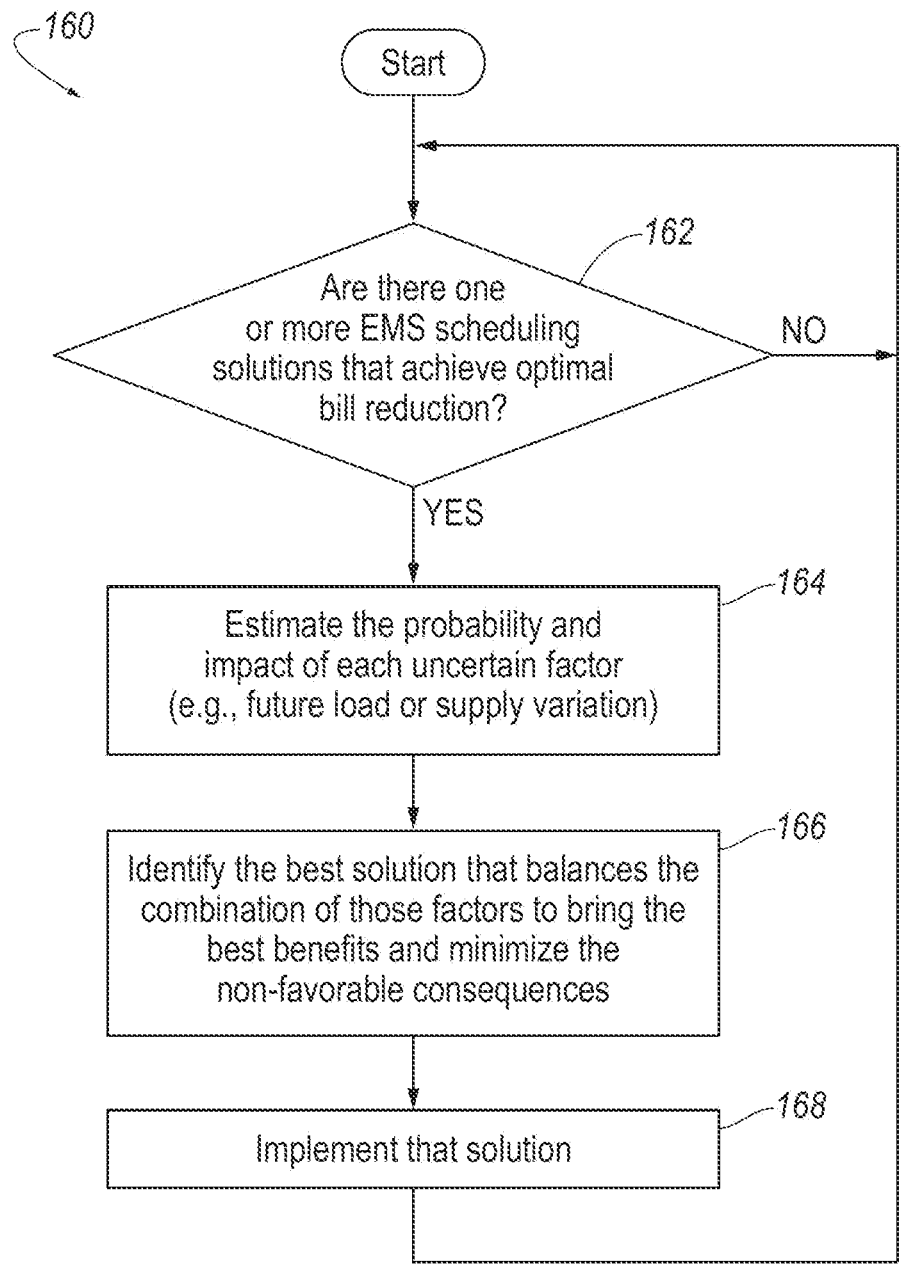
FIG. 7 illustrates a flowchart depicting more detailed operation of the proposed energy management control strategy.

Referring now FIG. 7, with continual reference to FIGS. 6A and 6B, a flowchart 160 depicting more detailed operation of the proposed energy management control strategy is shown. In some instances, a particular energy management event could be determined to both be favorable and non-favorable for different reasons, e.g., charging of onsite battery 58 during a low TOU rate period with high uncertainty in the future solar energy or load prediction. In these circumstances, the proposed energy management control strategy can determine the preferred energy management solution using multiple factors, each with their own estimate of influence and probability. From this multi-factor decision making, the factors that have the highest certainty (or lowest) and the biggest influence can be prioritized to determine the energy management solution for that particular event.

As set forth, flowchart 160 outlines the decision-making process using multiple factors as the criteria. As such, flowchart 160 is indicative of decision making based on evaluating energy management solutions which provide favorable and non-favorable results.

In operation, controller 70 detects whether there are one or more EMS scheduling solutions that achieve optimal bill reduction, as indicated in decision block 162. When a group of such energy management solutions are available, controller 70 estimates the probability and influence of each uncertain factor (e.g., future load or supply variation), as indicated by process block 164. Controller 70 then chooses from the group of energy management solutions the energy management solution which balances the combination of those factors to bring the best benefits and minimize the non-favorable consequences, as indicated in process block 166.

Controller 70 then controls energy facility 50 to implement the chosen energy management solution, as indicated in process block 168.

As described, the present disclosure provides an energy management control strategy for controlling an energy facility having a renewable energy source and an onsite energy storage device to prioritize favorable energy management actions to happen earlier than otherwise would occur when all other relevant criteria are at least substantially equal and to delay non-favorable energy management actions to happen later than otherwise would occur when all other relevant criteria are at least substantially equal.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. An energy facility having an energy storage device operable for receiving electricity from an external grid at different price rates during different periods with two of the periods having the lowest price rates, the energy facility comprising:
   a controller configured to charge the energy storage device during an earlier one of the two periods with electricity from the external grid in lieu of charging the energy storage device during a later one of the two periods with electricity from the external grid.

2. The energy facility of claim 1 wherein:
   the controller is further configured to charge the energy storage device during the earlier one of the two periods with an amount of electricity from the external grid sufficient to meet a forecasted demand for electricity to be provided by the energy facility during a period after the earlier one of the two periods and before the later one of the two periods.

3. The energy facility of claim 2 wherein:
   the controller is further configured to charge the energy storage device during the earlier one of the two periods with an additional amount of electricity from the external grid sufficient to meet a forecasted demand for electricity to be provided by the energy facility during a period after the later one of the two periods.

4. The energy facility of claim 1 wherein:
   the later one of the two periods has a lower rate than the earlier one of the two periods.

5. The energy facility of claim 1 wherein:
   the later one of the two periods has a higher rate than the earlier one of the two periods.

6. A method for use with an energy facility, the method comprising:
   selecting, from a group of energy management solutions which achieve favorable energy management activities with a same price of operation of the energy facility, an energy management solution resulting in favorable energy management results soonest; and
   controlling the energy facility according to the selected energy management solution.

7. The method of claim 6 wherein:
   the energy facility includes an onsite battery;
   the energy management solutions are to charge the onsite battery with electricity from an external grid purchasable at a same price; and
   the step of controlling the energy facility according to the selected energy management solution results in charging the onsite battery with electricity from the external grid soonest than all of the other energy management solutions.

8. The method of claim 6 wherein:
   the energy facility includes an onsite battery;
   the energy management solutions are to charge a load with electricity from the onsite battery during periods when electricity from an external grid is purchasable at a same price that is higher than later periods; and
   the step of controlling the energy facility according to the selected energy management solution results in charging the load with electricity from the onsite battery soonest than all of the other energy management solutions.

9. The method of claim 6 wherein:
   the energy facility includes an onsite battery and a renewable energy generator;
   the energy management solutions are to charge a load with electricity from the onsite battery during periods preceding periods of forecasted excess renewable energy being generated by the renewable energy generator; and
   the step of controlling the energy facility according to the selected energy management solution results in charging the load with electricity from the onsite battery soonest than all of the other energy management solutions.

10. The method of claim 6 wherein:
    the step of selecting includes considering probability of future load of the energy facility and/or of variation of energy available to the energy facility.

11. The method of claim 6 further comprising:
    selecting, from a second group of energy management solutions which achieve non-favorable energy management activities with a same price of operation of the energy facility, an energy management solution resulting in non-favorable energy management results latest; and
    controlling the energy facility according to the energy management solution selected from the second group.

12. The method of claim 11 wherein:
    the energy facility includes an onsite battery;
    the energy management solutions are to charge a load with electricity from the onsite battery during periods when electricity from an external grid is purchasable at a same price that is lower than earlier periods; and
    the step of controlling the energy facility according to the energy management solution selected from the second group results in charging the load with electricity from the onsite battery latest than all of the other energy management solutions.

13. An energy facility comprising:
    a controller configured to select from a group of energy management solutions which achieve favorable energy management activities with a same price of operation of the energy facility, an energy management solution resulting in favorable energy management results soonest, and to control the energy facility according to the selected energy management solution.

14. The energy facility of claim 13 further comprising:
    an onsite battery;
    wherein the energy management solutions are to charge the onsite battery with electricity from an external grid purchasable at a same price; and the controller is further configured to control the energy facility according to the selected energy management solution by controlling the onsite battery to be charged with electricity from the external grid soonest than all of the other energy management solutions.

15. The energy facility of claim 13 further comprising:
an onsite battery;
wherein the energy management solutions are to charge a load with electricity from the onsite battery during periods when electricity from an external grid is purchasable at a same price that is higher than later periods; and
the controller is further configured to control the energy facility according to the selected energy management solution by controlling the onsite battery to charge the load with electricity soonest than all of the other energy management solutions.

16. The energy facility of claim 15 wherein:
the load is either an electrified vehicle or an appliance located at the energy facility.

17. The energy facility of claim 13 further comprising:
an onsite battery and a renewable energy generator;
wherein the energy management solutions are to charge a load with electricity from the onsite battery during periods preceding periods of forecasted excess renewable energy being generated by the renewable energy generator; and
the controller is further configured to control the energy facility according to the selected energy management solution by controlling the onsite battery to charge the load with electricity soonest than all of the other energy management solutions.

18. The energy facility of claim 17 wherein:
the renewable energy generator is a solar panel assembly.

19. The energy facility of claim 13 wherein:
the controller is further configured to select from a second group of energy management solutions which achieve non-favorable energy management activities with a same price of operation of the energy facility, an energy management solution resulting in non-favorable energy management results latest, and to control the energy facility according to the energy management solution selected from the second group.

20. The energy facility of claim 19 further comprising:
an onsite battery;
wherein the energy management solutions are to charge a load with electricity from the onsite battery during periods when electricity from an external grid is purchasable at a same price that is lower than earlier periods; and
the controller is further configured to control the energy facility according to the energy management solution selected from the second group by controlling the onsite battery to charge the load with electricity latest than all of the other energy management solutions.

* * * * *